United States Patent [19]
Mita et al.

[11] Patent Number: 4,777,475
[45] Date of Patent: Oct. 11, 1988

[54] PHOTOELECTRIC MONITOR FOR MOLD

[75] Inventors: Akimitsu Mita, Tokyo; Yoshiyuki Arima; Fukuo Iwasaki, both of Yokohama, all of Japan

[73] Assignee: Nifco Inc., Yokohama, Japan

[21] Appl. No.: 829,315

[22] Filed: Feb. 14, 1986

[30] Foreign Application Priority Data

Feb. 14, 1985 [JP] Japan .................. 60-25167
Jul. 30, 1985 [JP] Japan ................. 60-166750
Jul. 30, 1985 [JP] Japan ................. 60-166751

[51] Int. Cl.$^4$ .................. G08B 21/00; G02B 6/36
[52] U.S. Cl. .................. 340/540; 350/96.2; 425/137
[58] Field of Search ........ 340/540, 674, 679, 555–557, 340/600; 425/137; 250/223 R; 318/480; 198/857; 350/96.2, 96.15; 403/DIG. 4, DIG. 6

[56] References Cited

U.S. PATENT DOCUMENTS

| | | | |
|---|---|---|---|
| 4,273,412 | 6/1981 | Hillegonds | 350/96.2 |
| 4,412,798 | 11/1983 | Avellino et al. | 425/137 |
| 4,456,822 | 6/1984 | Rose et al. | 250/223 R |
| 4,549,087 | 10/1985 | Duncen et al. | 250/223 R X |
| 4,652,082 | 3/1987 | Warner | 350/96.2 |

Primary Examiner—Glen R. Swann, III
Assistant Examiner—Thomas J. Mullen, Jr.
Attorney, Agent, or Firm—Oblon, Fisher, Spivak, McClelland & Maier

[57] ABSTRACT

A photoelectric monitor for a mold comprises a pair of securement members secured to opposite sides of a molding zone of a mold and provided with holes which are matched one-to-one with each other across the molding zone, two sensor blocks secured to a molder as spaced apart from the mold and including light-emitting elements and light-receiving elements, a controller connected to each of the sensor blocks, optical fibers each having its one end detachably connected to the light-emitting element of one of the sensor blocks and its other end detachably connected to one of the securement members through the hole, and optical fibers each having its one end detachably connected to the light-receiving element of the other sensor block and its other end detachably connected to the other securement member through the hole.

3 Claims, 4 Drawing Sheets

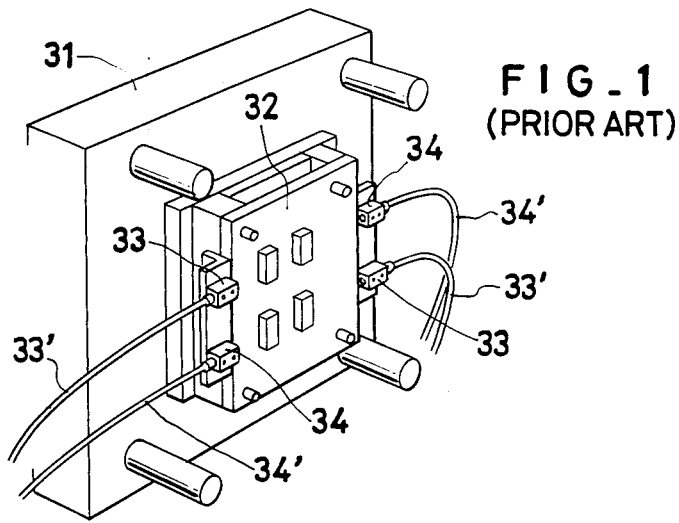
FIG_1
(PRIOR ART)
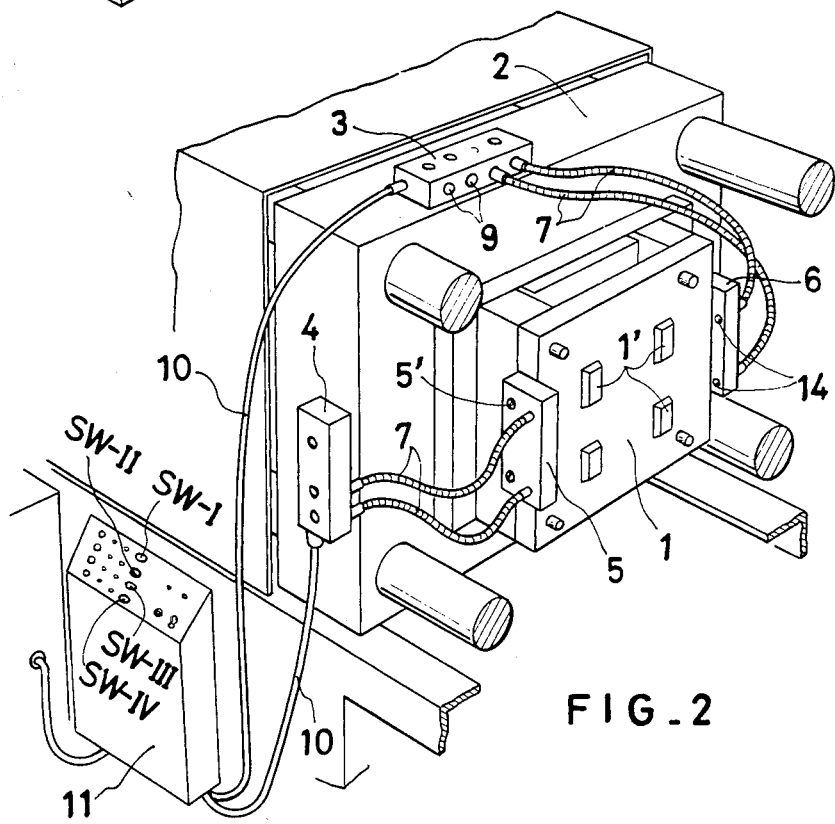
FIG_2

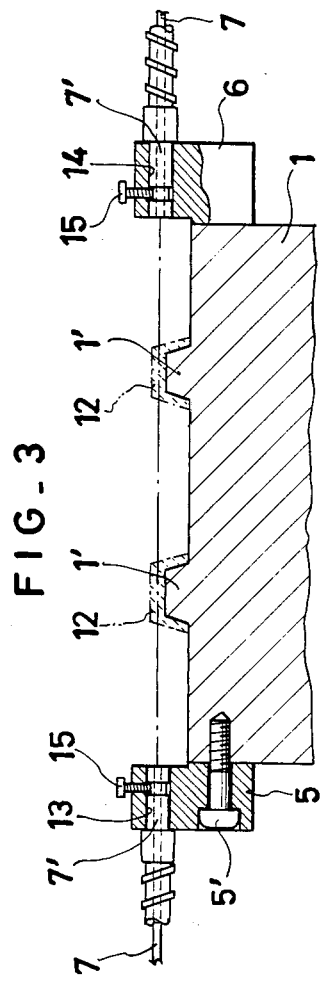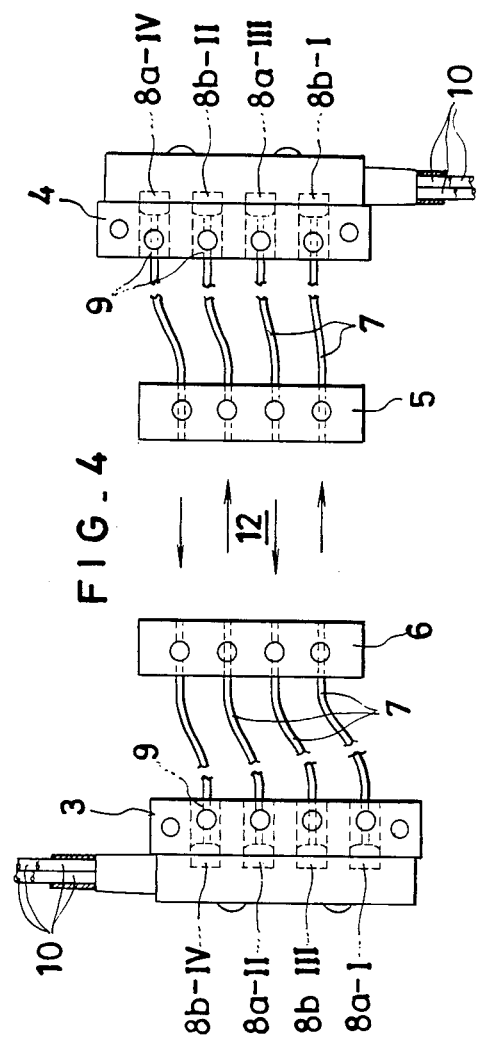

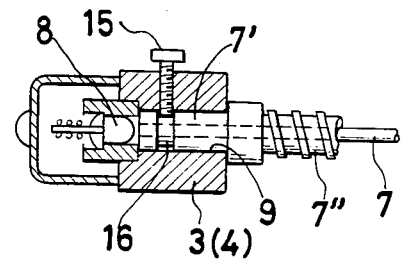
FIG_5
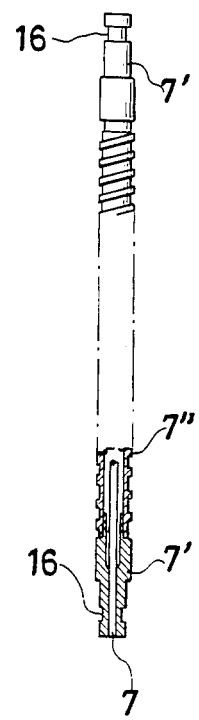
FIG_6
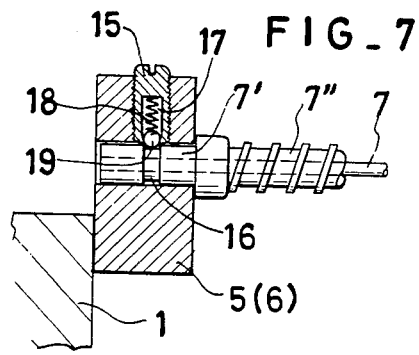
FIG_7
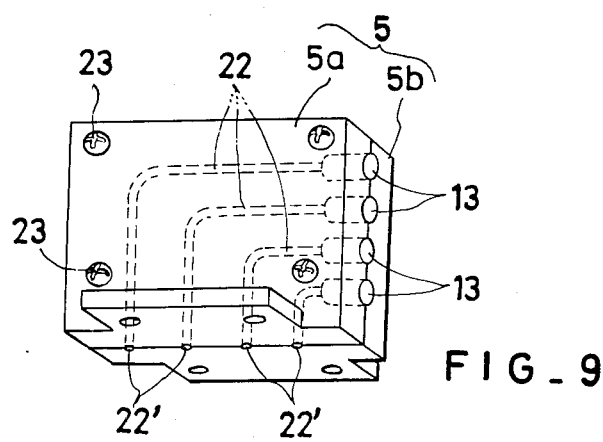
FIG_9

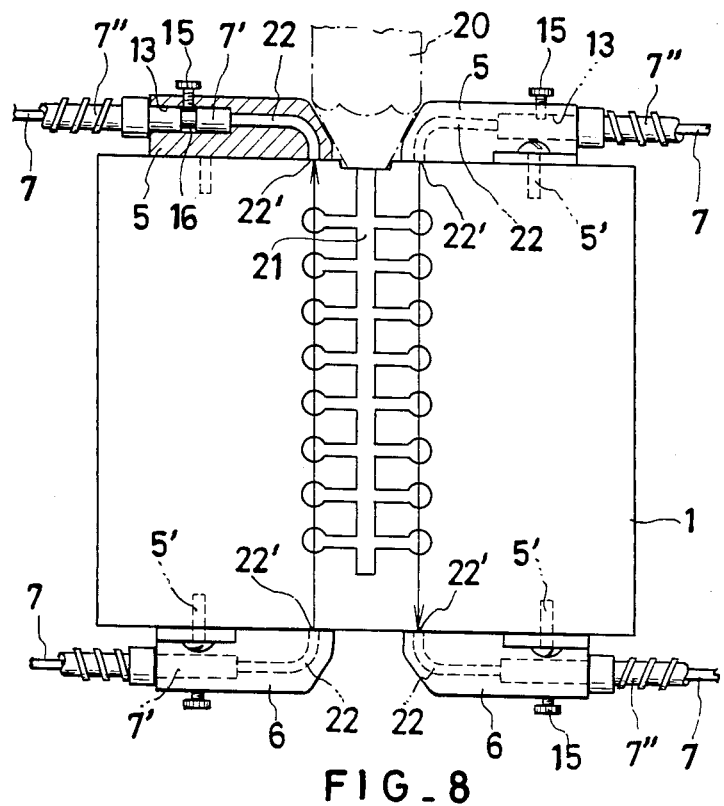
FIG_8
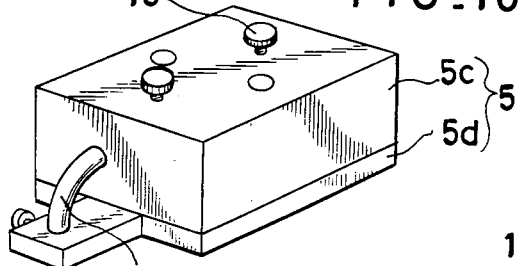
FIG_10
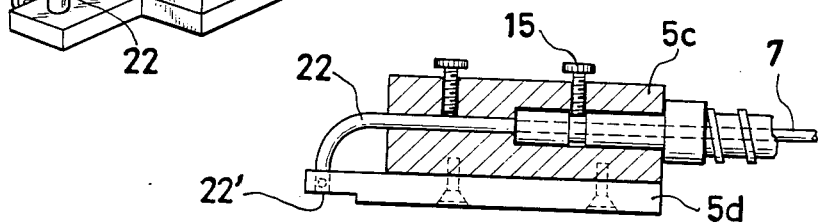
FIG_11

PHOTOELECTRIC MONITOR FOR MOLD

FIELD OF THE INVENTION AND RELATED ART STATEMENT

This invention relates to a photoelectric monitor for a mold of a molder for producing plastic moldings and, more particularly, to a photoelectric monitor of said type for checking whether any part of the molding (e.g., the product or a runner) remains attached to an open mold and, if there is such remaining part, stopping the next mold clamping operation and producing an alarm indicating the need to remove the remaining part, thereby preventing damage to the mold that may otherwise be caused by the next mold clamping operation in the presence of the remaining part.

FIG. 1 shows a prior art photoelectric monitor for a mold. In this monitor, pairs of light-emitting elements 33 and light-receiving elements 34 are secured to a mold 32 (usually a stationary mold) mounted on a platen 31 of a molder such that the members of each pair face each other. A light beam is projected from each light-emitting element 33 to the associated light-receiving element 34 across a molding zone. If the light beam is blocked by a part remaining in the mold so that it does not reach the light-receiving element 34, a controller, which is electrically connected to the elements by cords 33' and 34', provides a command for stopping the next operation for clamping a mold to the molder and also produces a light or sound alarm.

With this prior art device, however, a required number of pairs of light-emitting and light-receiving elements have to be secured to each mold, which is uneconomical. In addition, the light-emitting and light-receiving elements secured to the mold are subject to the influence of the mold temperature, leading to curtailed service life or erroneous function of the elements. Further, a restriction is imposed on the monitoring by the size of the housing of the light-emitting and light-receiving elements. More specifically, it is impossible to monitor the molding zone at intervals of less than the size of the housing.

SUMMARY AND OBJECT OF THE INVENTION

An object of the invention is to provide an economical photoelectric monitor for a mold, which is free from the service life curtailment of the light-emitting and light-receiving elements.

According to the invention, there is provided a photoelectric monitor for a mold for checking whether there is a molding remaining attached to the mold, in which light is emitted from a light-emitting element to a light-receiving element through a molding zone and, when light is blocked by a remaining molding so that it is not incident on the light-receiving element, a controller stops the next mold clamping operation and produces an alarm, comprising:

a pair of securement members provided on opposite sides of the molding zone, the securement members being formed with holes such that the holes in one securement member are matched one-to-one with the holes in the other securement member;

two sensor blocks secured to a molder and including light-emitting elements and light-receiving elements;

means for electrically connecting the two sensor blocks to the controller;

optical fibers each having one and connected to the light-emitting element in one of the sensor blocks and the other end inserted in the hole in one of said securement members; and optical fibers each having one end connected to the light-receiving element in the other sensor block and the other end inserted in the hole in the other securement member.

Light transmitted from light-emitting elements provided in one of the sensor blocks is transmitted through the optical fibers and projected from the holes in one of the securement members to the corresponding holes in the other securement member to be transmitted through the optical fibers to the light-receiving elements provided in the other sensor block. Since the two holes of the respective securement members face each other on the opposite sides of the molding zone of the mold, the light-receiving elements cannot receive light when there is a molding in the molding zone, but it can receive light when there is no molding present. When no light is received, the controller, which is connected to both the sensor blocks, stops the next mold clamping operation and provides a light or sound alarm indicating that there is a molding in the molding zone.

To replace the mold, each optical fiber is removed from the associated securement member, the old mold is then removed together with the securement members. Then, a new mold with similar securment members provided thereon and facing each other is mounted on a platen. Then the ends of the optical fibers having the opposite ends connected to the light-emitting and light-receiving elements in the respective sensor blocks are inserted in the opposed holes of the securement members and secured to the same. Thus, there is no need for providing light-emitting and light-receiving elements on each mold, which is economical.

The other objects and features of the invention will become more apparent from the following description with reference to the accompanying drawings.

BRIEF DESCRIPTION OF THE DRAWINGS

FIG. 1 is a perspective view showing a prior art photoelectric monitor for a mold;

FIG. 2 is a perspective view showing an embodiment of the photoelectric monitor for a mold according to the invention;

FIG. 3 is a sectional view showing the relation between the mold and the optical fiber securement member;

FIG. 4 is a plan view showing paired elements in two sensor blocks;

FIG. 5 is a sectional view showing a sensor block;

FIG. 6 is a plan view, partly in section, showing a portion of an optical fiber;

FIG. 7 is a sectional view showing a different example of an optical fiber securement member;

FIG. 8 is a view showing a photoelectric monitor according to the invention applied to a vertical molder;

FIG. 9 is a perspective view showing a different example of an optical fiber securement member;

FIG. 10 is a perspective view showing a further example of the optical fiber; and FIG. 11 is a sectional view showing the optical fiber securement member shown in FIG. 10.

DESCRIPTION OF THE PREFERRED EMBODIMENT

FIG. 2 shows an embodiment of the photoelectric monitor for monitoring whether a molding remains in a stationary mold of an ordinary molder. A stationary mold 1 is mounted on a stationary platen 2. Two sensor blocks 3 and 4 are secured to the platen 2 at positions not interfering with the installation, opening or closing of the mold on the platen 2. A pair of optical fiber securement members 5 and 6 are secured to opposite sides of the mold 1 at a mold zone where a molding may possibly remain between them.

The sensor blocks 3 and 4 each accommodate four elements, i.e., two light-emitting and two light-receiving elements. As shown in FIG. 5, these elements are each provided at the bottom of a hole 9, into which one end of an optical fiber 7 is inserted. In this embodiment, two light-emiting elements and two light-receiving elements are provided alternately in each sensor block in order to prevent erroneous operation due to interference that may otherwise occur from the incidence of light from the light-emitting element in one block with the light-receiving element in the other block which is not associated with that light-emitting element. Of course, it is alternatively possible to provide only light-emitting elements in one sensor block 3 or 4 and provide only light-receiving elements in the other sensor block. In either case, each element (i.e., light-emitting element or light-receiving element) of each sensor block and a corresponding element (i.e., either light-receiving element or light-emitting element) of the other block sensor are connected to a controller 11 of a well-known photoelectric monitor apparatus through cords 10, and these elements are paired in the controller. As shown in FIG. 4, light-emitting and light-receiving elements 8a-I and 8b-I of the sensor blocks 3 and 4 are paired, light-emitting and light-receiving elements 8a-II and 8b-II of these sensor blocks are paired, light-emitting and light-receiving elements 8a-III and 8b-III of the sensor blocks are paired, and light-emitting and light-receiving elements 8a-IV and 8b-IV of these sensor blocks are paired. When light from a light-emitting element is not received by the corresponding light-receiving element, the controller detects this and stops the next mold clamping operation and also produces a sound or light alarm. The controller includes switches SW-I to SW-IV for the respective element pairs, and the pair to be operated is selected by on-off operating the corresponding switch.

The optical fiber securement members 5 and 6 face each other on opposite sides of the mold zone where there may be a residual molding. They are secured by screws 5' to the mold and have holes 13 and 14, into which the other ends of the optical fibers are inserted. In this embodiment, the mold has four molding sections 1' arranged in two columns and two rows for simultaneously forming four moldings. The holes 13 and 14 may be provided two holes for each column or row. Even in the case of a mold having molding sections arranged in two columns and three rows or arranged in three columns and two rows, the securement member may have holes 13 or 14 with two holes in a row if the securement member is oriented in the direction of the arrangement of two columns or two rows. Further, it is possible to provide a greater number of rows and a greater number of columns by increasing the number of sensor block elements.

Each end of each optical fiber 7, as shown in FIG. 6, has secured to it a metal or plastic tip 7' having an annular groove 16 formed in the outer periphery. Between the opposite end tips 7' the optical fiber is covered by a flexible stainless steel tube 7". The tips 7' are provided for improving handling property when inserting and removing the end of the optical fiber into and from a hole 9 of the sensor block and holes 13 and 14 of securement members 5 and 6 and also for the stability of mounting. As shown in FIG. 5, when the end of the optical fiber is inserted into the hole 9, a screw 15 is screwed in so that its end is received in the annular groove 16 of the tip to prevent detachment of the optical fiber from the hole 9. The flexible stainless steel tube protects the optical fiber against heat and bending.

FIG. 7 shows a modification of the arrangement for installing and removing the optical fiber 7 with respect to the sensor block or securment member. In the illustrated example, the optical fiber 7 is inserted and removed with respect to securement members 5 and 6. A coil spring 18 and a ball 19 are accommodated in a blind bore 17 formed in a screw 15 screwed in the securement member. The ball 19 is spring biased by the coil spring 18 so that its spherical surface partly projects from the end of the screw 15. In order to prevent detachment of the ball 19 from the blind bore 17, the open end of the blind bore 17 is deformed such that its diameter is smaller than the diameter of the ball 19 after the coil spring 18 and the ball 19 have been inserted into the blind bore 17. Thus, less than one half of the ball 19 projects from the end of the screw.

The screw 15 is screwed in a threaded hole formed in the stationary block or securement member so that a portion of the surface of the ball 19 projects from the end of the screw into the hole 9, 13 or 14.

When the end of the optical fiber 7 is inserted into the hole, the ball 19 is first pushed into the blind bore 17 by the outer periphery of the end against the spring 18. When the annular groove 16 reaches the position of the ball 19, the ball 19 is pushed by the spring 18 into the annular groove 16. Thus, the tip 7' is prevented from detachment, thus completing the securement of the optical fiber 7. The optical fiber 7 can be detached by pulling it out in the opposite direction. As a result, the ball 19 is again forced into the blind bore 17 against the force of the spring 18. With the above construction, the optical fiber can be installed in and removed from the sensor block or securement member by a single action.

With the mold 1 mounted on the stationary platen 2 and with the securement members 5 and 6 provided with holes 13 and 14 two for each column or row, the end of an optical fiber 7 is inserted into the hole 9, in which the light-emitting element 8a-I of the sensor block 3 is provided, and the end of another optical fiber 7 is inserted into the hole 9, in which the light-receiving element 8b-III of the block sensor 3 is provided. The other ends of these optical fibers 7 are inserted into the two holes 14 of the securement member 6. These optical fibers are thus secured to sensor block 3 and securement member 6. Likewise, two optical fibers are inserted at their respective one ends into the holes 9, in which the light-receiving and light-emitting elements 8b-I and 8a-III of the sensor block 4 which are paired with the respective elements 8a-I and 8b-III are provided, and the other ends of these optical fibers are inserted into the holes 13 of the securement member 5. Again these optical fibers are secured. In this case, of course the optical fibers associated with elements 8a-I and 8b-I are secured respectively to the holes 14 and 13 facing each other, and likewise the optical fibers associated with elements 8b-III and 8a-III are secured respectively to the holes 14 and 13 facing each other.

Further, since only two pairs of elements, i.e., a pair of elements 8a-I and 8b-I and a pair of elements 8a-III and 8b-III, are to be operated, the switches SW-I and SW-III of the controller are turned on, while the other switches are kept "off" to prevent erroneous operation of the element pairs which are not operated.

Subsequently, a movable mold is brought into engagement with the stationary mold, and the two molds are clamped together to form a cavity between them. Then, the movable mold is opned, and a molding kick-out operation is effected. Thereafter, the controller 11 operates the light-emitting and light-receiving elements to check as to whether light that is to be received by the light-receiving elements is blocked by a molding remaining in the molding zone of the mold. If it detects that light is blocked, the controller 11 issues a command for stopping the next mold clamping operation to the molder. At the same time, it generates a light or sound alarm. If no blocking of light is detected, the controller 11 issues a command for the next mold clamping operation to be molder.

When the mold 1 is replaced, the optical fibers are removed from the holes of the securement members 5 and 6, then the mold is removed, and a new mold is mounted. If the securement members 5 and 6 provided on the opposite sides of this new mold have holes 13 and 14 three for each column or row, two more optical fibers are used to operate three element pairs.

In the above embodiment, the sensor blocks are secured to the sides of the platen. This is done so for the purpose of reducing the length of the optical fibers as much as possible. If there is no need for reducing the optical fiber length, the sensor blocks may be secured to other positions of the molder.

FIGS. 8 to 11 illustrate application of the photoelectric monitor according to the invention to a vertical molder. As shown in FIG. 8, optical fiber securement members 5 arc secured by screws 5' to the top of a stationary mold 1 of the vertical molder and on the opposite sides of a gate 21, onto which a molding nozzle 20 is lowered for injection of the molding material. The securement members 5 are secured so as not to interfere with the descent of the molding nozzle 20. The securement members 5 each have a hole having a bent portion. An optical fiber 22 is inserted through the hole so that its end 22' is exposed at the contact section between the securement member 5 and the mold 1. The other end of the hole is open at the bottom of a hole 13.

The securement members 5 are secured to the top of the mold such that the ends 22' of optical fibers 22 are directed down, i.e., toward the molding zone of the mold (here product cavities are present on both sides of the runner). The securement members 6 are likewise secured to the bottom of the mold 1 with the ends of the optical fibers 22 directed up, i.e., toward the molding zone. The tips 7' of the optical fibers 7 are inserted into the holes 13 of the securement members and retained there by means of screws 15. The other end of the optical fiber 7 connected to either the upper or lower one of the pair of securement members is connected to a light-emitting element in one of the sensor blocks, while the other end of the optical fiber connected to the other securement member is connected to the corresponding light-receiving element in the other sensor block. After a molding kick-out operation subsequent to the opening of the mold following a molding operation, the controller operates the light-emitting and light-receiving elements to check whether light emitted by the light-emitting element is received by the light-receiving member. When it is detected that light is received, the mold clamping operation is started for the next molding. If it is found that no light is received, the controller determines that the molding remains. In this case, the controller issues a command to prevent the mold clamping operation while also providing a sound or light alarm.

The construction shown in FIG. 8 is for monitoring only a single molding zone. Where a plurality of molding zones are to be monitored at one time, a plurality of optical fibers 22 may be provided as shown in FIG. 9.

To provide the securement member 5 with one or more optical fiber holes having curvedly bent portions, as shown in FIGS. 8 and 9, the securement member 5 may be constituted as two halves 5a and 5b as shown in FIG. 9, the mating surfaces of these mold halves being formed with grooves having a semi-circular sectional profile constituting optical fiber holes and groove constituting the holes 13. The two halves 5a and 5b are coupled together face to face by screws 23.

In the embodiment shown in FIGS. 8 and 9, the entire length of optical fibers 22 is round in the securement members 5, so that the optical fibers 22 can be protected against high temperature of the molding nozzle or the like. In the embodiment of FIGS. 10 and 11, the stationary block 5 consists of a thick block 5c and a plate 5d secured to the underside of the block 5c and projecting from one end thereof. The block 5c has a hole open at one end and a hole 13 open at the other end, these holes being coaxial and communicating with each other, the optical fiber 33 being inserted through the hole. The end of the optical fiber 22 is secured in position by the screw 15.

To replace the mold, as in the previous embodiment, each optical fiber is withdrawn together with the tip from the hole of the securement member, then the mold is removed, and a new mold is mounted. Then, the optical fibers are attached to the securement members.

As has been described in the foregoing, according to the invention a pair of monitoring plates having holes facing one another are secured to the opposite sides of the mold with a molding zone found between them while light-emitting and light-receiving elements are provided in two sensor blocks which are secured in positions spaced apart from the mold. Therefore, it is possible to eliminate the waste of securing elements to each mold and also eliminate damage to or erroneous function of elements with changes in the mold temperature. It is thus possible to extend the service life of the elements.

Further, since the optical fiber diameter may be made smaller than the size of the element, it is possible to reduce the molding zone monitoring pitch down to the outer diameter of the optical fiber. Further, the operation of mounting and removing the optical fiber ends with respect to the monitoring plate holes and sensor blocks is easy and not so time-consuming.

What is claimed is:

1. A photoelectric monitor for a mold for checking whether there is a molding remaining attached to the mold, in which light is emitted from a light-emitting element to a light-receiving element through a molding zone and, when light is blocked by a remaining molding so that it is not incident on the light-receiving element, a controller stops the next mold clamping operation and produces an alarm, comprising:

a pair of securement members provided on opposite sides of said molding zone, said securement members being formed with holes such that the holes in one securement member are matched one-to-one with the holes in the other securement member;

two sensor blocks secured to a molder and including light-emitting elements and light-receiving elements;

means for electrically connecting the two sensor blocks to said controller;

optical fibers each having one end connected to a light-emitting element in one of the sensor blocks and the other end inserted in a hole in one of said securement members; and optical fibers each having one end connected to a light-receiving element in the other sensor block and the other end inserted in a hole in the other securement member, the opposite ends of each of said optical fibers having secured thereto tips each having an annular groove.

2. A photoelectric monitor according to claim 1, wherein one end of each of said optical fibers is inserted into a hole in one of said securement members and is fastened to the securement member with a screw by inserting the leading end of said screew into said annular groove of the tip secured to the optical fiber.

3. A photoelectric monitor according to claim 2, wherein said screw has a ball projected from the leading end thereof and biased by a spring, and one end of each of said optical fibers is fastened to one of said securement members by fitting said ball in said annular groove of the tip secured to the optical fiber.

* * * * *